(12) United States Patent
Krug et al.

(10) Patent No.: US 10,993,575 B2
(45) Date of Patent: May 4, 2021

(54) DRINKS PREPARATION MACHINE

(71) Applicant: QBO Coffee GmbH, Wallisellen (CH)

(72) Inventors: Jörg Krug, Steffenberg (DE); Sophie Schwerdtfeger, Zürich (CH)

(73) Assignee: QBO COFFEE GMBH, Wallisellen (CH)

( * ) Notice: Subject to any disclaimer, the term of this patent is extended or adjusted under 35 U.S.C. 154(b) by 294 days.

(21) Appl. No.: 15/779,273

(22) PCT Filed: Nov. 28, 2016

(86) PCT No.: PCT/EP2016/079042
§ 371 (c)(1),
(2) Date: May 25, 2018

(87) PCT Pub. No.: WO2017/093201
PCT Pub. Date: Jun. 8, 2017

(65) Prior Publication Data
US 2018/0352996 A1 Dec. 13, 2018

(30) Foreign Application Priority Data
Dec. 1, 2015 (EP) ..................................... 15197377

(51) Int. Cl.
*A47J 31/36* (2006.01)
*A47J 31/44* (2006.01)

(52) U.S. Cl.
CPC ....... *A47J 31/3633* (2013.01); *A47J 31/3676* (2013.01); *A47J 31/4407* (2013.01); *A47J 31/4492* (2013.01)

(58) Field of Classification Search
CPC ................ A47J 31/3633; A47J 31/3676; A47J 31/4492; A47J 31/4407
See application file for complete search history.

(56) References Cited

U.S. PATENT DOCUMENTS 9,119,503 B2 * 9/2015 Gavillet .............. A47J 31/3628
2007/0034085 A1 2/2007 Wang
(Continued)

FOREIGN PATENT DOCUMENTS

CN 104771077 A * 7/2015
EP 1 440 637 7/2004
(Continued)

OTHER PUBLICATIONS

English translation of International Preliminary Report on Patentability dated Jun. 5, 2018 (Jun. 5, 2018), Application No. PCT/EP2016/079042, 6 pages.
(Continued)

*Primary Examiner* — Jacob J Cigna
(74) *Attorney, Agent, or Firm* — Rankin, Hill & Clark LLP

(57) ABSTRACT

A beverage-making machine for making a beverage from a portion capsule has a motorized brewing module that has a first brewing module part and a second brewing module part, which can be moved relative to the first brewing module part. A brewing chamber can be formed by the first and second brewing module parts, the brewing chamber at least partly surrounding the portion capsule. The beverage-making machine includes a closing unit and a sensor. The closing unit includes a manually actuatable operating lever that can be pivoted about a pivot axis between a closed position, in which the operating lever closes the capsule insertion opening, and an open position, in which the capsule insertion opening is accessible. The sensor can be used to ascertain whether the operating lever has assumed the closed position.

11 Claims, 3 Drawing Sheets

(56) References Cited

U.S. PATENT DOCUMENTS

| | | | |
|---|---|---|---|
| 2007/0068394 A1 | 3/2007 | Jarisch et al. | |
| 2008/0148948 A1* | 6/2008 | Evers | B65B 69/005 99/275 |
| 2011/0265659 A1* | 11/2011 | Giua | A47J 31/3676 99/295 |
| 2012/0231126 A1* | 9/2012 | Lo Faro | A23F 5/262 426/115 |
| 2013/0247771 A1* | 9/2013 | Maisch | A47J 31/3633 99/283 |
| 2013/0344206 A1* | 12/2013 | Yoakim | A47J 31/4492 426/232 |
| 2015/0056343 A1 | 2/2015 | Mori et al. | |
| 2016/0166105 A1* | 6/2016 | Bugnano | A47J 31/4492 426/232 |
| 2016/0220062 A1* | 8/2016 | Hanes | A47J 31/3695 |
| 2016/0242591 A1* | 8/2016 | Rubin | A47J 31/3638 |
| 2017/0215625 A1* | 8/2017 | Fontbonne | A47J 31/467 |
| 2017/0251862 A1* | 9/2017 | Bolognese | A47J 31/3633 |

FOREIGN PATENT DOCUMENTS

| | | | |
|---|---|---|---|
| EP | 2 571 404 | 4/2014 | |
| EP | 3 028 608 | 6/2016 | |
| EP | 3 031 748 | 6/2016 | |
| EP | 3 031 749 | 6/2016 | |
| EP | 3 031 750 | 6/2016 | |
| JP | 2016112171 A * | 6/2016 | |
| WO | 2011/144719 | 11/2011 | |
| WO | 2012/093107 | 7/2012 | |
| WO | 2015/091301 | 6/2015 | |
| WO | WO-2016005417 A1 * | 1/2016 | A47J 31/52 |

OTHER PUBLICATIONS

English translation of Japanese Office Action dated Sep. 29, 2020, Application No. 2018-528312, 2 pages.

* cited by examiner

DRINKS PREPARATION MACHINE

BACKGROUND OF THE INVENTION

Field of the Invention

The invention relates to the field of appliances for preparing hot and/or cold drinks. It especially relates to a drinks preparation machine for preparing a drink from a portion capsule.

Description of Related Art

Drinks preparation machines that use an extraction material that is brought into a portion capsule are known, for example, as coffee or espresso machines. It is likewise known to bring the portion capsule into the drinks preparation machine via a capsule insert opening. Such a capsule insert opening can be closable by way of a closure unit, which for its part includes a displaceable or pivotable element.

In particular, displaceable or pivotable elements of the mentioned type are used with drinks preparation machines with conventional, i.e. non-motorised, horizontal brewing modules. Herein, the slidable or pivotable element is mechanically coupled to the brewing chamber, so that the actuation of the mentioned element leads to the closing or opening of the brewing chamber.

EP 2 571 404 discloses a mechanical closure unit, concerning which the user closes the brewing chamber of the drinks preparation machine by way of moving a grip and simultaneously closes the capsule insert opening by way of the grip covering this opening. The brewing chamber is opened again and the capsule insert opening is rendered accessible again, by way of a corresponding opposite movement.

With regard to drinks preparation machines with motorised brewing modules, the closing of the capsule insert opening as a rule takes place via a covering, which can be operated, e.g., by way of pushing a button.

WO 2012/093107 discloses a drinks preparation machine, concerning which a motorised brewing module is combined with a manually operable covering and concerning which the closing of the covering is determined by a sensor and effects a closing travel of the brewing chamber. Herein, the covering is designed as a laterally guided plate that is slidable along the housing of the drinks preparation machine and is arrested during the brewing procedure as well as during the opening and closing of the brewing chamber.

At present, manually operable closure units, which are applied in combination with motorised brewing modules, have various disadvantages. For example, these are only guided laterally, which although permitting a simple moving, however this being either against a large friction force or with a corresponding large play and with a reduced positional accuracy, which leads to a high proneness to becoming damaged and often to a low-quality impression.

SUMMARY OF THE INVENTION

It is an object of the invention to provide a drinks preparation machine that overcomes the disadvantages of the state of the art. In particular, it is an object of the invention to ensure a high automation with a high user friendliness and user safety, together with a high user comfort.

A drinks preparation machine of the type according to the invention is designed as a drinks preparation machine for preparing a drink, in particular a hot drink such as coffee or tea, from a portion capsule. The drinks preparation machine includes a motorised brewing module that contains a brewing chamber, which can be formed from a first brewing module part and a second brewing module part, which is movable relative to this. The brewing chamber, which can be formed in this manner, at least partly surrounds a portion capsule, which is located in a brewing position, during the brewing procedure. Herein, the brewing module is configured to brew a brewed drink by way of introducing a brewing fluid into the portion capsule and to discharge this out of the brewing chamber. The brewed drink subsequently via a drinks outlet gets into a drinks vessel, which is placed below a drinks outlet.

The motorised brewing module further includes an electrical drive which effects the movement of the second brewing module part relative to the first brewing module part.

The drinks preparation machine further includes a housing and a capsule insert opening, wherein the capsule insert opening is configured such that a portion capsule can be inserted via it into the drinks preparation machine.

The drinks preparation machine further includes a closure unit and a sensor. The closure unit for its part includes a manually operable operating lever. The operating lever is pivotable about a rotation axis between a closed position and an open position, wherein by way of the sensor it can be determined whether the operating lever assumes the closed position.

The closed position and the open position for example form the two limiting positions which limit a movement range of the operating lever.

The capsule insert opening is accessible in the open position. In particular, the operating lever leaves the capsule insert opening uncovered to such an extent that the portion capsule can be inserted through the capsule insert opening.

In the closed position, the capsule insert opening in particular is closed such that no object can get into the inside of the drinks preparation machine. Supplementarily, the capsule insert opening can be closed such that also no light can get into the inside of the drinks preparation machine. For example, a region of the operating lever can come to lie over the capsule insert opening in the closed position and thus be designed such that it extends at least over the complete surface of the capsule insert opening.

Any element that is capable of converting the assumption of the closed position by the operating lever or the transition of this into the closed position, into a signal that can be evaluated by the control is considered as a sensor. For example, the sensor can be a switch, in particular a microswitch.

In an embodiment, the drinks preparation machine further includes a control. In particular, the brewing procedure or a process that precedes the brewing procedure can be started or enabled via the assumption of the closed position by the operating lever. An example of a procedure which precedes the brewing procedure is an automatic capsule recognition. The enabling of the brewing procedure or of a preceding procedure can include the release of an operating element or of one or more options in an operating menu.

The operating lever is pivotable by way of applying a force. In particular, the closure unit can be configured such that the movement of the operating lever between the open and the closed position is continuous. The continuous movement can be interrupted or completed by a possibly sudden latching-in at characteristics positions, in particular in the two defined positions ("open", "closed").

In an embodiment of the drinks preparation machine, the closure unit further includes a resistance element, in order to provide the user who applies the force for moving the operating lever with a haptic feedback, i.e. the resistance element is designed such that it forms a resistance to a movement of the operating lever, the resistance being dependent on a position of the operating lever, by which means the force that is necessary for moving the closure element is also dependent on the position of the operating lever.

In particular, the position of the operating lever can be given by its angular position, which is given via its movement about the rotation axis relative to the closed position. In this case, the resistance varies in dependence on the angular position.

In particular, the resistance element is designed such that the haptic feedback simulates one or more of the following procedures, which are characteristic of drinks preparation machines with a manually closable brewing chamber:

The piercing of the portion capsule;
The sliding of the position capsule at least into the second movable brewing module part;
The closing of the brewing chamber.

In an embodiment, the resistance is created by friction and/or elastic deformation. For this, the resistance element can be a spring which on closing is deformed against its spring force and/or along which an element of the closure unit drags. In an embodiment example, the resistance element is a curved sheet spring, along which a part of the closure unit travels.

In an embodiment of the drinks preparation machine, the closure unit further includes a cam, which is likewise movable about the rotation axis by way of a pivoting movement of the operating lever and is connected to this, for example, in a rotationally fixed manner. At least on assuming the closed position by the operating lever does such a cam interact with the sensor in a manner such that the transition of the operating lever into the closed position and/or the condition of the assumed closed position can be determined by the sensor.

The cam and the operating lever can be manufactured of one piece. In this case, the cam and the operating lever form a rocker, which in the closed position interacts with the sensor.

However, the cam and operating lever can be two different parts of the closure unit, wherein the movement of the cam is in an unambiguous relation with the movement of operating lever.

In an embodiment of the drinks preparation machine, the movement of the second brewing module part is mechanically decoupled from the movement of the operating element. This means that a movement of the operating lever does not lead to a direct movement of the second brewing module part any more than a movement of the second brewing module part leads to a movement of the operating lever.

However, at least the assumption of the closed position by the operating lever or a moving of the operating lever into the closed position or from the closed position via the sensor can have an influence upon the movement of the second brewing module part. In particular, the moving of the second brewing module part for closing or opening the brewing chamber can be coupled to the condition of the assumption of the closed position by the operating lever, for safety-technical considerations.

Due to the mentioned mechanical decoupling, the drinks preparation machine can also be configured such that the moving of the operating lever into the open position does not interrupt a running brewing procedure. It is particularly with embodiments of the drinks preparation machine, concerning which the portion capsule is not brought directly into a position between the first and second brewing module part via the capsule insert opening that this can be advantageous and for example lead to a quicker sequence of drinks preparations that are subsequent to one another.

In an embodiment, the operating lever is also pivotable during the brewing procedure, i.e. the operating lever is not arrested during any phase of the brewing procedure. In particular, the operating lever can be moved out of the closed position during the brewing procedure. In such embodiments, the drinks preparation machine can be configured such that a pivoting of the operating lever out of the closed position during the brewing procedure is determined by the sensor and the brewing procedure is stopped. In such embodiments, a very intuitive possibility of stopping the brewing process is available to the user.

By way of a suitable programming of the drinks preparation machine, one can determine whether the moving of the operating lever during the brewing process only interrupts this, i.e. whether it is continued after a renewed assumption of the closed position by the operating lever or whether the brewing process is valid as being completed.

Alternatively or supplementarily, embodiments of the drinks preparation machine which include a first brewing module part and a second brewing module part that is movable relative to this can be configured to eject a spent portion capsule out of the brewing module without actuating the operating lever or an operating element, i.e. the drinks preparation machine is programmed to open the brewing chamber after completion of the brewing process until the spent portion capsule drops downwards into the capsule container, even if the user has neither actuated the operating lever nor made a dedicated input.

In an embodiment, the drinks preparation machine includes a display device, for example a display and/or buttons with an individually changeable colour impression, and an operating element, for example a jog dial and/or a screen. The display device and the operating element can also be realised by an element, for example a touch screen or the buttons with an individually changeable colour impression.

In such embodiments, the drinks preparation machine can be configured, via the display device, to display a number of brewing programs that can be selected via the operating element. Herein, the number of selectable brewing programs can be dependent on a result of the capsule recognition.

At least the selectable brewing programs can thereby be restricted to those brewing programs that can be prepared by the drinks preparation machine at the point on time of the selection. As to which brewing programs can be prepared at the momentary point in time and therefore selected depends on the condition of the drinks preparation machine and its modules, in particular on filling levels and/or the result of the capsule recognition.

In embodiments, concerning which the drinks preparation machine includes a milk module, the condition of the milk module can influence the selectable brewing programs. The condition of the milk module in particular is defined by its connection or its non-connection to the drinks preparation machine as well as possibly by a filling level.

In an embodiment, the drinks preparation machine further includes a capsule recognition module. This is configured to carry out a capsule recognition on a portion capsule that was brought through the capsule insert opening into a capsule recognition position. The capsule recognition is effected by way of predefined features.

These features are, for example, optically readable features such as a bar code, a 2D matrix code (for example QR code or Aztec code), a code according to one of the European patent applications 14 197 487.3, 14 197 488.1 and/or 14 197 489.9, a pictogram (icon) and/or a certain colouring. The capsule recognition module then includes an optical sensor, for example a camera, for reading out the predefined features. However, other features such as, for example, magnetic characteristics or an RFID chip, which can be read out in a contact-free manner are also conceivable.

The drinks preparation machine that includes a capsule recognition module is further configured such that the capsule recognition takes place automatically after the assumption of the closed position by the operating lever. In particular, a start of the capsule recognition is linked to the sensor determining the assumption of the closed position. In comparison to procedures that are activated by the user, this procedure on the one hand has the advantage that in the case of capsule recognition modules with an optical sensor, one prevents scatter light from getting through the capsule insert opening into the capsule recognition module—the capsule recognition is coupled to a closure and therefore also to the darkening of the capsule recognition module. The capsule recognition module can include its own light source for the reading-out, the light source producing a defined light distribution on the portion capsule. A further advantage results from the intuitive operation: the user does not necessarily notice at all that he activates a capsule recognition procedure.

In an embodiment, the capsule recognition position and the brewing position are different from one another. After an effected capsule recognition, a transfer of the portion capsule from the capsule recognition position into the brewing position is necessary, wherein the mentioned transfer for example requires an activation by the user. In particular, the activation can be effected by the selection of a brewing program which is selectable after the capsule recognition.

Alternatively, the mentioned transfer can also be activated in one of the following manners:

The user has selected a selectable brewing program before the capsule recognition and the capsule recognition has resulted in a portion capsule which matches the selection;

The user has given his consent to an automated start of the brewing procedure without a capsule recognition or without taking the capsule recognition into account, before the insertion of the portion capsule into the capsule insert opening or before the capsule recognition;

The user has given his consent to a start of the brewing procedure without taking into account the capsule recognition, after the capsule recognition, In an embodiment, the portion capsule is removable again out of the drinks preparation machine via the capsule insert opening after the capsule recognition, but before the closing of the brewing chamber. Since the portion capsule remains unscathed until the closing of the brewing chamber, the intact portion capsule can consequently be removed again from the drinks preparation machine for a later use.

If, as mentioned, the capsule recognition position is different from the brewing position, then such a removal can be possible before the transfer into the brewing chamber—for example if the user, via the display device, recognises that the capsule sort is not suitable for preparing the drinks which he desires.

In particular, the drinks preparation machine can include a grip recess that is accessible from the capsule insert opening. This permits the user to grip the portion capsule, which is located in the capsule recognition position, and to remove it via the capsule insert opening.

BRIEF DESCRIPTION OF THE DRAWINGS

Embodiment examples of the invention are hereinafter described by way of figures. In the figures, the same reference numerals indicate the same or analogous elements. There are shown in.

DETAILED DESCRIPTION OF THE INVENTION

Figure 1:
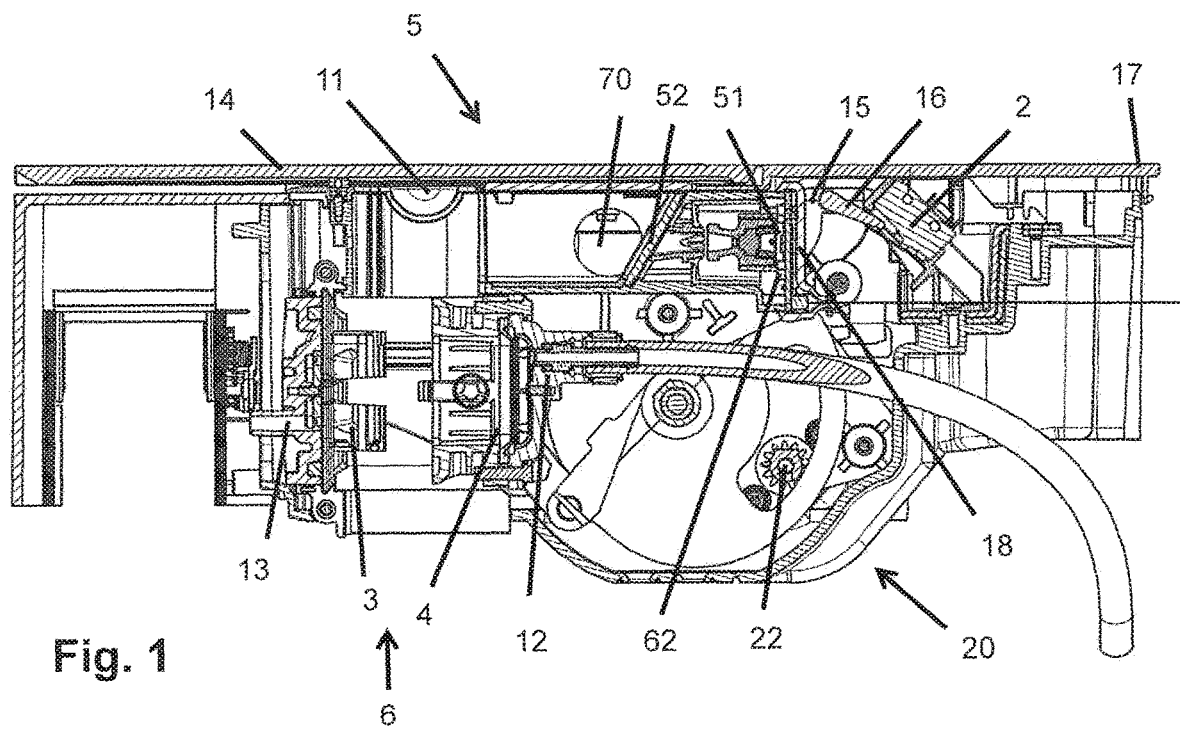
FIG. 1 a cross section of a region of a drinks preparation machine with an installed closure unit, including a pivotable operating lever in the closed position and with a sensor for determining the closed position.

FIG. 1 shows the part-region of a drinks preparation machine 10 for preparing a drink from a portion capsule, the part-region being of relevance to the invention. What is represented is a brewing module 6, which includes a first brewing module part 3 and a second brewing module part 4. The second brewing module part 4 is movable relative to the first brewing module part 3 via a drive mechanism 20. The drive mechanism 20 is driven by an electric drive 22. The second brewing mould part 4 can assume different positions, which are characteristic of the drinks preparation, by way of this. A first position, in which a brewing chamber is formed together with the first brewing module part 3, a second position, in which the portion capsule can be brought into a region between the two brewing module parts, a third position, in which a spent portion capsule can be ejected out of this region, and a fourth position, in which the insertion of a portion capsule into this region is prevented belong to such positions. The fourth position also serves for holding a portion capsule in a defined position outside the brewing module, in particular in a capsule recognition position within the capsule recognition module 5. Further positions, which can be moved to by the brewing module part 4, are service positions and a stand-by position.

Motorised brewing modules for drinks preparation machines for preparing a drink from a portion capsule and in particular a representation of a possible principle, with which a transfer from the capsule recognition position into a brewing position is regulated are described in detail in the European patent application 14 195 680.5.

The first brewing module part 3 includes a discharge device 13 for a drink that is brewed in the brewing chamber. The second brewing module part 4 includes an injector 12 for feeding a brewing fluid, as a rule hot water, into the brewing chamber which is formed by the two brewing module parts.

FIG. 1 further shows a capsule recognition module 5, including a camera sensor 51, a capsule recognition window 52, a light source 62 and a fan 70. Capsule recognition modules for drinks preparation machines for preparing a drink from a portion capsule are described in detail in the European patent application 14 195 680.5.

In the shown embodiment drinks preparation machine 10, the capsule recognition module 5 is arranged directly below the upper, horizontal part of the housing 17 in a manner such that a portion capsule can be inserted into a capsule recognition position of the capsule recognition module 5 via the capsule insert opening 11.

The brewing module 6 lies below the capsule recognition module 5. The position of the brewing module 6 is selected such that a portion capsule, which is located in the capsule recognition position, is held in the capsule recognition position by the second brewing module part and that the portion capsule, which is located in the capsule recognition position, can get into a brewing position between the two brewing module parts inasmuch as the second brewing module part 4 assumes a position that no longer prevents this transfer of the portion capsule from the capsule recognition module 5 into the brewing module 6.

In the embodiment of the drinks preparation machine 10, which is shown in FIG. 1, this, apart from a housing 17 and a circuit board 18 of the sensor electronics, includes a microswitch 2, which includes a sheet metal tab 2', and a closure unit 1. The closure unit 1 includes an operating lever 14 and a cam 16, both of which are pivotable about a rotation axis 15. The circuit board 18 forms a rear-side wall of the capsule recognition module 5.

The manual operability of the operating lever 14 is ensured by way of an easily grippable design of the operating lever and the arrangement of the operating lever 14 on an upper side of the drinks preparation machine 10.

The operating lever 14 and the cam 16 are connected to one another in a rotationally fixed manner and they are connected to the housing 17 of the drinks preparation machine 10 at the rotation axis 15.

The closed position of the operating lever 14, which is shown in FIG. 1, is characterised in that the operating lever 14 runs parallel to the surrounding part of the housing 17 and herein closes the capsule insert opening 11. The operating lever 14 and the cam 16 are arranged relative to one another to the extent that the cam 16 exerts a pressure upon the sheet metal tab 2' in the closed position of the operating lever 14, in order to ensure that the microswitch 2 correctly determines the closed position of the operating lever 14. The microswitch 2 is moreover spatially aligned such that the cam 16 can easily produce a force perpendicularly to the alignment of the sheet metal tab 2'.

In a projection of the operating lever 14 and the cam 16 onto a plane perpendicular to the rotation axis 15, the smaller angle between the position of the operating lever 14 and the position of the cam is about 80 degrees (common rotation axis as the origin of the coordinates system forming the basis of the angle detail). Larger or smaller angles are possible without further ado, depending on the design of the drinks preparation machine 10.

Figure 2:
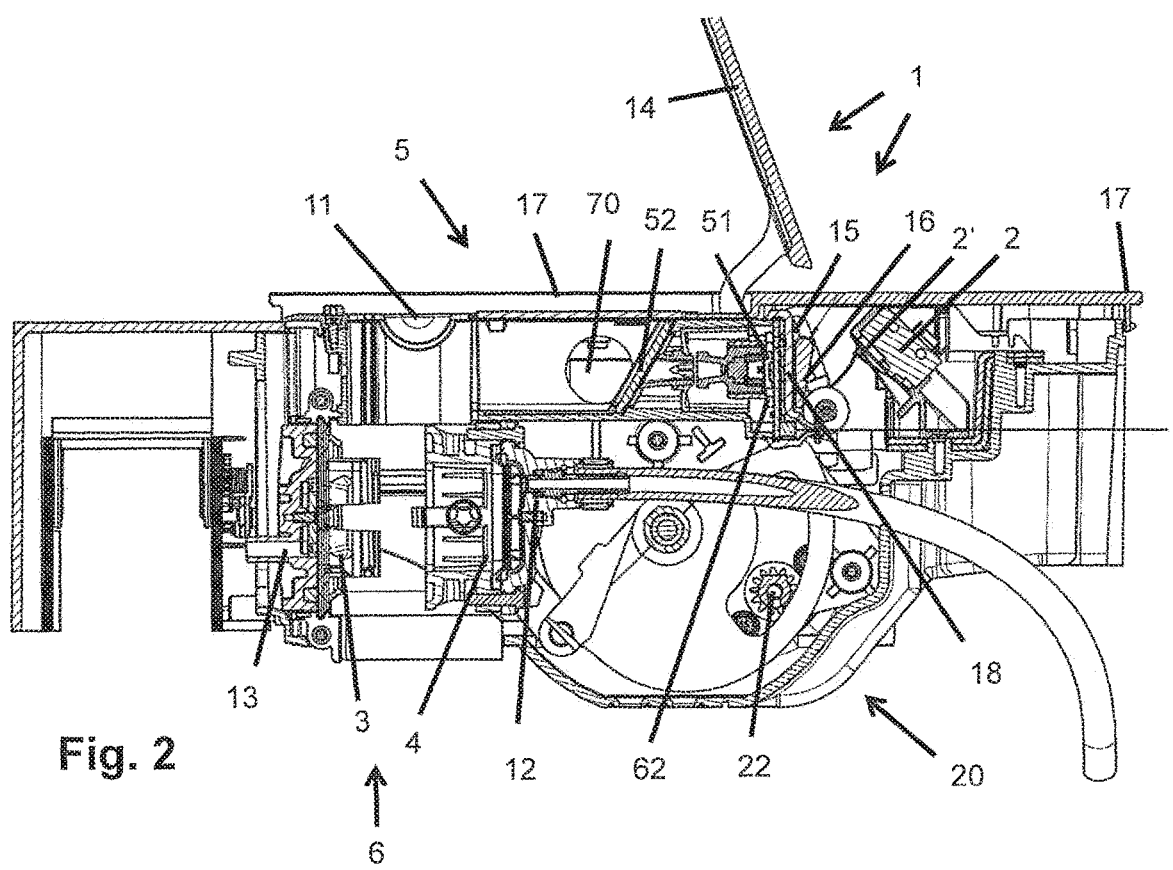
FIG. 2 a cross section of the region of the drinks preparation machine according to FIG. 1 with the operating lever in the open position.

FIG. 2 shows the drinks preparation machine 10 according to FIG. 1 with the operating lever 14 in an open position. In the shown embodiment, the cam 16 is in contact with the circuit board 18 of the capsule recognition module 5. A further rotation of the cam about the rotation axis 15 and of the operating lever 14, which is fixedly connected to the cam via the common rotation axis 15, is prevented by way of this.

The position of the operating lever, which is defined by the contact of the cam 16 with the circuit board 18, characterises the open position of this.

On account of the relative position of the operating lever 14 and of the cam 16 to one another, the position having already been described beforehand and which in the shown embodiment is given by the mentioned angle of about 80 degrees, the distance between the capsule insert opening 11 and the operating lever 14 in the open position is large enough to insert a portion capsule along the axis of the capsule insert opening 11, i.e. normally to the part of the housing 17, which directly surrounds the capsule insert opening 11, without rubbing on or hitting the operating lever.

Figure 3:
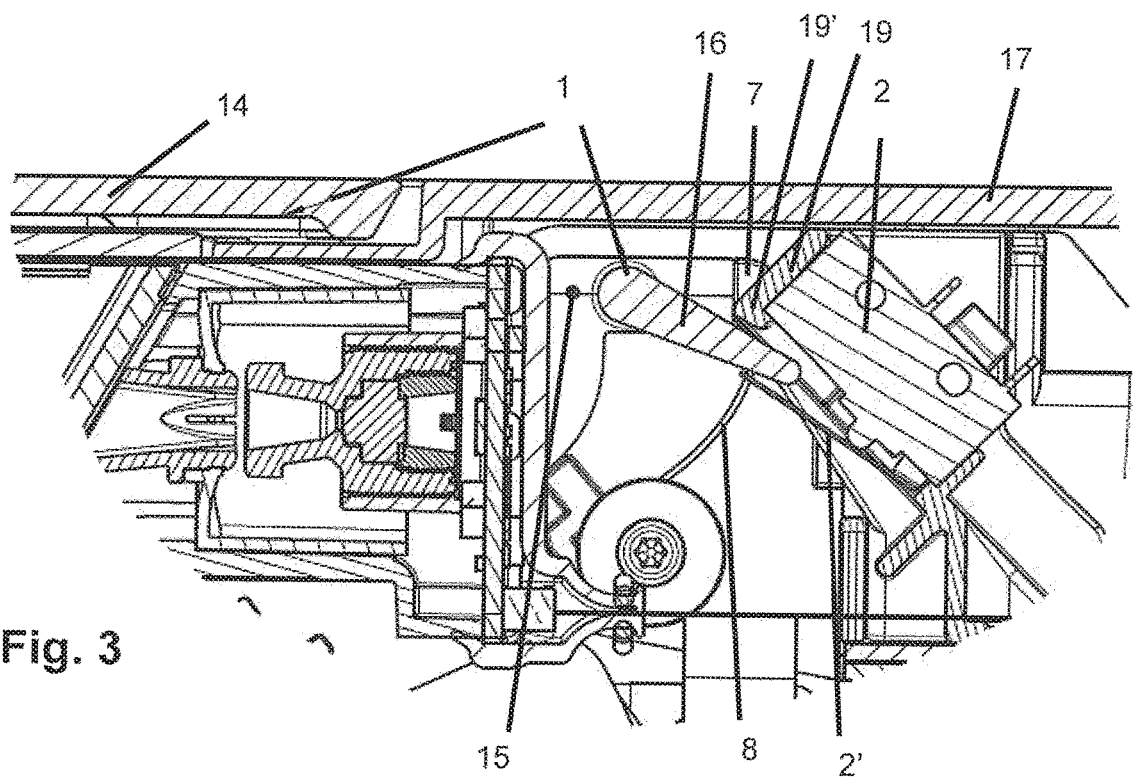
FIG. 3 a detailed view of the region of the drinks preparation machine according to FIG. 1 with the operating lever in the closed position.

FIG. 3 shows a detailed view of the region of the drinks preparation machine 10 according to FIG. 1, which better visualises the interaction between the cam 16 and the microswitch 2. In this, the rotation axis 15, the cam 16 as well as the sheet metal tab 2' of the microswitch 2 are clearly visible. As already explained, the closed position of the operating lever 14 is characterised in that on the one hand this lever runs parallel to the surrounding regions of the housing 17 of the drinks preparation machine 10 and herein closes the capsule insert opening 11 (not visible in FIG. 3) and that on the other hand the cam 16 exerts a pressure upon the sheet metal tab 2', so that this is pressed in the direction of the sensor 2. In FIG. 3, the position of the sheet metal tab 2' is represented to the left of the cam 16 instead of between the cam 16 and the sensor 2, which is not completely correct.

In the shown embodiment, the microswitch 2 is held in position by a holder 19, which additionally includes a continuation 19'. The continuation 19' defines a maximal deflection of the cam 16 and prevents too much pressure being exerted upon the sheet metal tab 2'.

Figure 4:
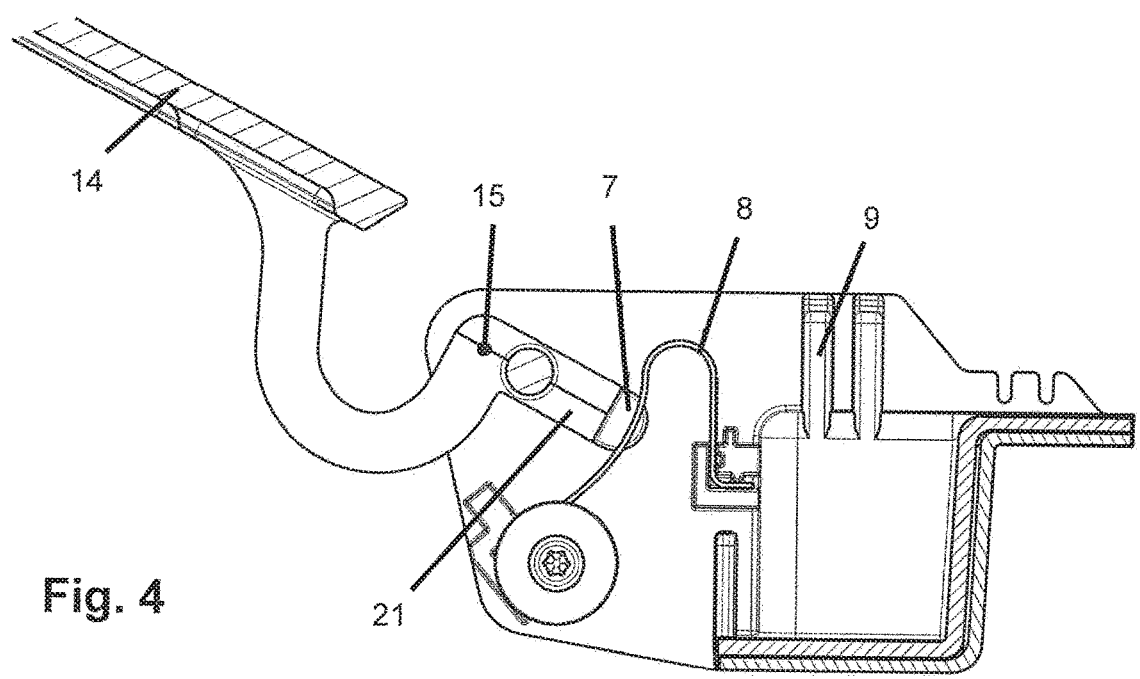
FIG. 4 a detailed view of an embodiment of a resistance for producing a haptic feedback.

FIG. 4 shows an embodiment of the drinks preparation machine 10, in which a resistance can be generated via a device for producing a haptic feedback to the user, the device including an arcuate sheet spring 8 and a resistance holder 9.

In the embodiment according to FIG. 4, the operating lever 14 includes two fork-like lever continuations 21 close to the rotation axis 15 (only the rear one of the two lever continuations 21 is shown). Plastic caps 7, which press against the bent sheet spring 8, are attached at the end of these two lever continuations 21

On moving the operating lever 14, friction and therefore a resistance, which can be perceived by the user arises on account of the pressure between plastic caps 7 and the sheet spring 8. The sheet spring 8 is moreover deformed against its spring force to a particularly large extent by the resistance continuations 21 when the operating lever 14 approaches the closed position. As soon as the spring arch has been overcome, the user feels a sudden compliance, similar to a latching. The pressing pressure and therefore the magnitude of the friction or the resistance can be set via the contour of the sheet spring 8, which is to say via its local bending. The resistance can herewith be varied in an arbitrary manner over the complete movement region of the operating lever 14, which is limited by the assumption of the open and closed position. In particular, a varying resistance, which imitates the mechanical resistance of a brewing group, can be imitated.

Figure 5:
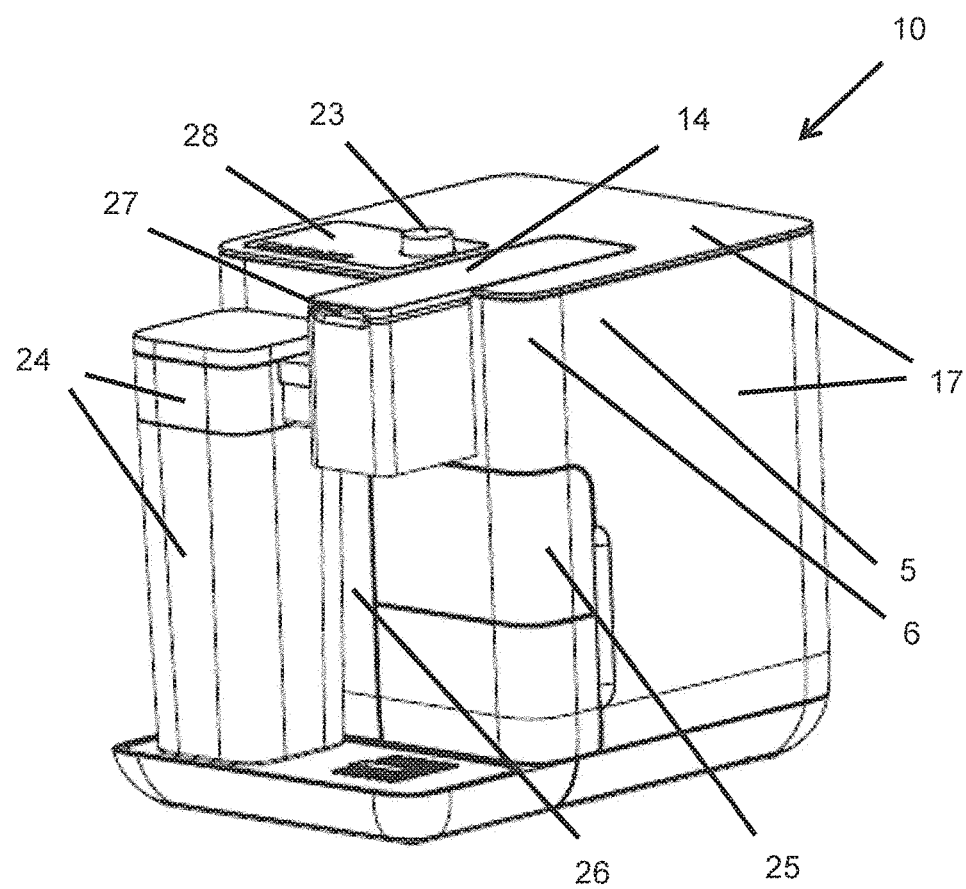
FIG. 5 an external view of a drinks preparation machine which amongst other things includes a capsule recognition module, a closure unit, a milk module and an operating unit.

An outer view of a drinks preparation machine 10 for preparing a drink from a portion capsule is represented in FIG. 5, wherein this figure, apart from the operating lever 14 in the closed position, shows the approximate position of the capsule recognition module 5 and of the brewing module 6, the housing 17, as well as an operating element 23, a display device 28, a milk module 24, a capture container 25 and a water tank 26 (partly covered by the milk module 24).

Seen from the outside, it is only the operating lever 14 of the closure unit 1 that is visible and this lever in the closed position of the closure unit 1 forms a horizontal surface with an upper horizontal part of the housing 17 and completely covers the capsule insert opening 11 as well as the upper region of the capsule recognition module 5 (reference numeral indicates the approximate position in the inside of the drinks preparation machine 10). The operating lever 14 and the regions of the housing 17 which are adjacent to it include recesses 27 for an improved manual operability.

The brewing module 6 (reference numeral represents the approximate position in the inside of the drinks preparation machine 10) is arranged directly below the capsule recognition module 5.

The milk module 24, the water tank 26 and the capture container 25 are examples of modules of the drinks preparation machine 10 which, on account of their filling level and/or their presence or their absence, influence the brewing programs that can be selected by the user, for drinks that can be prepared by the drinks preparation machine 10 at a certain point in time.

The selectable brewing programs are visible on the display device 28, which is a display, and can be selected via the operating element 23, which here is a jog dial. An operation via a touchscreen operating element, which unifies the display device 28 and the operating element 23, or remotely via a mobile device, which communicates with the drinks preparation machine 10 is also conceivable, wherein the communication in particular takes place in a wireless manner.

LIST OF REFERENCE NUMERALS

1 closure unit
2 sensor/microswitch
2' sheet metal tab
3 first brewing module art
4 second brewing module part
5 capsule recognition module
6 brewing module
7 plastic cap
8 sheet spring
9 resistance holder
10 drinks preparation machine
11 capsule insert opening
12 injector (water feed)
13 discharge device (drinks outlet)
14 operating lever
15 rotation axis
16 cam
17 housing
18 circuit board (PCB)
19 holder
19' continuation
20 drive mechanism
21 lever continuation
22 electrical drive
23 operating element
24 milk module
25 capture container
26 water tank
27 recesses
28 display device
51 camera sensor
52 capsule recognition window
62 light source
70 fan

The invention claimed is:

1. A drinks preparation machine for preparing a drink from a portion capsule, comprising a motorized brewing module containing:
 a first brewing module part and a second brewing module part, said second brewing module part being movable relative to the first brewing module part, wherein a brewing chamber can be formed by the first and second brewing module part, wherein during a brewing procedure said brewing chamber at least partly surrounds the portion capsule which is located in a brewing position, wherein the brewing module is configured to brew a brewed drink by way of introducing a brewing fluid into the portion capsule and to discharge this drink out of the brewing module; and
 an electrical drive for moving the second brewing module part relative to the first brewing module part;
 wherein the drinks preparation machine further comprises a housing with a capsule insert opening, through which the portion capsule can be inserted into the drinks preparation machine,
 wherein the drinks preparation machine further comprises a closure unit and a sensor,
 wherein the closure unit comprises a manually operable operating lever that is pivotable about a rotation axis between a closed position, in which the operating lever closes the capsule insert opening, and an open position, in which the capsule insert opening is accessible, wherein it can be determined by the sensor as to whether the operating lever assumes the closed position,
 wherein the operating lever is pivotable by way of applying a force, and
 wherein the closure unit further comprises a resistance element that opposes a movement of the operating lever with a resistance that varies dependent on a position of the operating lever.

2. The drinks preparation machine according to claim 1, wherein the resistance is based on friction and/or elastic deformation.

3. The drinks preparation machine according to claim 1, wherein the closure unit further comprises a cam that is movable by way of a pivoting movement of the operating lever about a rotation axis and which is designed, on assumption of the closed position by the operating lever, to interact with the sensor such that the assumption of the closed position by the operating lever can be determined.

4. The drinks preparation machine according to claim 1, wherein the movement of the second brewing module part relative to the first brewing module part and the movement of the operating lever are mechanically decoupled from one another.

5. The drinks preparation machine according to claim 1, wherein the drinks preparation machine is further configured to eject a spent portion capsule out of the brewing module without actuation of the operating lever.

6. The drinks preparation machine according to claim 1, further comprising a display device and an operating element, wherein the drinks preparation element is configured, via the display device, to display a number of brewing programs that can be selected via the operating element, in a manner depending on a result of a capsule recognition.

7. The drinks preparation machine according to claim 1, wherein the drinks preparation machine is configured, after the effected capsule recognition, to permit a removal of the portion capsule through the capsule insert opening before the brewing chamber is closed.

8. The drinks preparation machine according to claim 1, wherein the operating lever is also pivotable during the brewing procedure.

9. The drinks preparation machine according to claim 8, wherein a pivoting of the operating lever out of the closed position during the brewing procedure stops the brewing procedure.

10. The drinks preparation machine according to claim 1, further comprising a capsule recognition module that is configured to carry out a capsule recognition on a portion capsule that is inserted through the capsule insert opening and is located at the capsule recognition position, by way of predefined features, wherein the drinks preparation machine is configured to activate the capsule recognition after the assumption of the closed position by the operating lever.

11. The drinks preparation machine according to claim 10, wherein the capsule recognition position and the brewing position are different from one another, and wherein a transfer of the portion capsule from the capsule recognition position into the brewing position requires an activation by the user.

\* \* \* \* \*